United States Patent [19]

Bernard et al.

[11] Patent Number: 4,869,815
[45] Date of Patent: Sep. 26, 1989

[54] FLUIDIZED BED REACTOR WITH MEANS FOR ENSURING HOMOGENEOUS DISTRIBUTION OF THE FLUID TO BE TREATED

[75] Inventors: Jacques Bernard, St Germain en Laye; Jean-Marie Rovel, Rueil Malmaison, both of France

[73] Assignee: Degremont, Rueil Malmaison, France

[21] Appl. No.: 744,267

[22] Filed: Jun. 13, 1985

[30] Foreign Application Priority Data

Jun. 13, 1984 [FR] France ............................. 84 09235

[51] Int. Cl.$^4$ .............................................. C02F 3/06
[52] U.S. Cl. .................................. 210/151; 210/189; 210/269
[58] Field of Search ............... 210/617, 618, 786, 788, 210/189, 150, 151, 264, 269, 284, 290, 512.1

[56] References Cited

U.S. PATENT DOCUMENTS

| | | | |
|---|---|---|---|
| 4,052,300 | 10/1977 | Mosso ................................. | 210/786 |
| 4,126,546 | 11/1978 | Hjelmner et al. ................ | 210/786 X |
| 4,141,824 | 2/1979 | Smith ................................. | 210/618 |
| 4,202,774 | 5/1980 | Kos ..................................... | 210/274 |
| 4,265,767 | 5/1981 | Gappa et al. .................... | 210/189 X |
| 4,412,923 | 11/1983 | Capitani et al. ................ | 210/189 X |
| 4,561,974 | 12/1985 | Bernard et al. .................. | 210/617 X |

FOREIGN PATENT DOCUMENTS 0090450 10/1983 European Pat. Off. .
1592403 5/1970 France .

OTHER PUBLICATIONS

P. F. Cooper et al.: "Biological Fluidized Bed Treatment of Water and Wastewater", pp. 167, 362 and 366–367, Ellis Horwood Ltd., Chichester, GB.

*Primary Examiner*—Tom Wyse
*Attorney, Agent, or Firm*—Wenderoth, Lind & Ponack

[57] ABSTRACT

A fluidized bed reactor for the biological treatment of a fluid includes granular treating material through which the fluid to be treated passes upwardly, thereby fluidizing the treating material, during which biological treatment is achieved. A homogeneous distribution of the fluid into the bottom of the granular treating material is achieved by providing a granular transfer material beneath the granular treating material, and introducing the fluid to be treated into the granular transfer material at a speed and under conditions sufficient to impart movement to the granular transfer material causing uniform distribution of the fluid and uniform diffusion thereof upwardly into the granular treating material at a speed sufficient to achieve fluidization thereof.

13 Claims, 2 Drawing Sheets

FLUIDIZED BED REACTOR WITH MEANS FOR ENSURING HOMOGENEOUS DISTRIBUTION OF THE FLUID TO BE TREATED

BACKGROUND OF THE INVENTION

The present invention relates to a fluidized bed reactor for the biological treatment of fluids, particularly liquids, and more particularly water, the reactor being of the type containing granular solid treating material suspended in a fluid bed by the passage upwardly therethrough of a fluid current, during which biological treatment of the fluid is achieved, the fluidized bed providing a very large specific surface of granules which are in continuous motion and which are exposed on all sides to the fluid to be treated.

Such fluidization technique is well known and is applied for carrying out numerous chemical reactions, heat exchange operations, combustion operations, and the like, as well as anaerobic or aerobic biological treatment of water. During such treatments of water, the fluidizing agent is the water to be treated, with or without the supply or formation of gas. Starting with a given uniform and vertical speed of the fluid, i.e. water, across a homogeneous layer of granular material, expansion of the latter occurs. The granules no longer are cohesive and are agitated. The passage cross-section available for the fluid is increased, and up to an upper speed limit the granules remain in equilibrium between the force of gravity and the force of entrainment by the fluid. Within the speed range of the fluid which assures fluidization of the granular material, the upper surface of the bed of granular material, turbulent as it may be, is easily adjusted and is substantially horizontal. Expansion of the bed is above 10% and normally is between 20% and 60% with respect to the initial bed volume at rest.

Compared to traditional treatment techniques, such as free culture reactors or immobilized culture reactors on fixed beds, used for the biological treatment of water, the fluidized bed technique offers a number of advantages. It is possible to obtain excellent contact between the water to be purified and the bacterial mass developed on the granules. There is achieved renewal of the solid-liquid contact surfaces. There is only a minor loss of head caused by the addition of impurities.

Further, it is known that biological fluidized bed reactors make it possible to attain volume loads which are very superior to those permitted by traditional techniques with free culture reactors and immobilized culture reactors on fixed beds. For anaerobic processes, for example, which are particularly well adapted to fluidized bed reactors, since there is no problem involved in oxygen in diffusion yield of the gas as in aerobic processes, loads of 30 to 50 kg $CDO/m^3/day$ are possible with fluidized beds treating industrial effluents, particularly those originating from various processes employed in the agro-feed industry. The fluidized bed technique also is very well adapted to the elimination of nitrates from underground water.

However, fluidized bed reactors of the past have had certain inherent disadvantages which have hampered the development of industrial use of such reactors. Specifically, it has been difficult to provide an industrial scale fluidized bed reactor whereby it is possible to reliably, simply and easily ensure uniform distribution of the fluid to be treated at the base of the fluidized bed reactor. On the other hand, numerous studies involving smaller scale laboratories and pilot plant installations have confirmed the importance and advantages of fluidized bed reactors from a purely biokinetic viewpoint.

In fact, a homogeneous distribution of the fluid to be treated and the constancy of such homogeneous distribution are fundamental to the practical employment of a fluidized bed reactor. An uneven distribution leads to delays and to the simultaneous creation of insufficiently agitated and highly turbulent zones. Thereby, performance is reduced, and there also occur losses of granular material.

Any device employed to ensure the homogeneous distribution of the fluid, specifically water, to the base of the reactor must be adapted to the quality of the raw water to be treated. Particularly, if residual waters are involved (of industrial or domestic origin), any such device must not be sensitive to the presence in the water of foreign bodies or materials in suspension of more or less large dimensions. Furthermore, any such device must not be sensitive to the formation of bacterial growths forming in the devices and which result in the formation of more or less sticky and troublesome deposits on solid surfaces.

Known supply devices, for example as disclosed in U.S. Pat. No. 4,202,774 or in European Pat. No. 0 090 450, generally comprise a plurality of liquid injection nozzles or orifices at the base of the reactor. These devices, while generally satisfactorily avoiding excessive turbulence of the solid granular material in the reactor, also have certain disadvantages.

Specifically, voluminous materials contained or suspended in the water to be treated can at any time cause obstruction of one or more of the feed orifices or nozzles, thereby disturbing the required uniform distribution of the supply of the water over the entire surface or cross section of the granular material in the reactor. Thus, maintenance of this supply arrangement is random at best, and it is very difficult to ensure constancy of a homogeneous distribution of the water to be treated.

SUMMARY OF THE INVENTION

With the above discussion in mind, it is an object of the present invention to provide an improvement whereby it is possible to ensure a homogeneous distribution of the fluid to be treated into the bottom of the granular treating material to be fluidized.

It is a further object of the present invention to provide such an improvement whereby it is possible to overcome the above and other prior art disadvantages.

It is a more specific object of the present invention to provide in a reliable and stable manner the regular and homogeneous supply of fluid to be treated in large scale fluidized bed reactors, even when the fluid to be treated contains or suspends large size materials or foreign bodies, and/or even when bacterial growth occurs.

These objects are achieved in accordance with the present invention by the provision of a layer of granular transfer material positioned beneath the granular treating material which is to be fluidized, and means for introducing the fluid to be treated into the granular transfer material at a speed and under conditions sufficient to impart movement thereto causing a uniform distribution of the fluid and uniform diffusion thereof upwardly into the granular treating material at a speed to achieve fluidization thereof. The fluid to be treated therefore is introduced uniformly into the granular treating material from the granular transfer material, and the granular transfer material acts to ensure uniform distribution of the speed of propagation of the fluid into the granular treating material.

In accordance with the present invention, the reactor includes a single casing or housing defined by plural superposed connected enclosures including a lower enclosure containing the granular transfer material and one or more upper enclosures containing the granular treating material. The upper and lower enclosures are dimensioned such that the granular transfer material is not fluidized upwardly and is not involved in the biological treatment of the fluid. The fluid to be treated is introduced into the lower enclosure by a single pipe extending tangentially to the lower enclosure and introducing all of the fluid. The fluid is introduced at a high speed sufficient to ensure fluidization of the granular treating material, specifically at a nominal speed of from 1.5 to 3.5 m/s. The upper and lower enclosures are constructed and dimensioned such that the granular transfer material operates only to transfer the fluid to be treated to the layer of granular treating material. The granular transfer material does not itself become fluidized and does not participate in the biological treatment of the fluid. Thus, the granular transfer material forms a feed and distribution zone, whereas the granular treating material itself forms a fluidization zone which is the operational area of the biological reactor. The power dissipated in the lower enclosure containing the granular transfer material is above 500 W/m$^3$. The rapid start-up of movement of the granular transfer material makes it possible to avoid such material becoming coated by biological bacterial growth. Such material therefore does not participate in the biological reaction and preserves stable physical characteristics, such that the function of energy dissipation and the function of distribution by such material is assured without adjustment. The speed of the liquid through the granular treating material, on the other hand, is such as to allow development of the bacterial film employed for the biological treatment.

In accordance with a further aspect of the present invention, there is provided means for removing the granular treating material from the reactor, for regenerating the thus removed granular material (for example, for removing therefrom excess bacterial growth), and for returning the thus regenerated granular treating material to the reactor. This regenerating means preferably comprises an exterior washer including an arrangement for intensively recirculating the granular treating material within the washer before it is regenerated and returned to the reactor.

BRIEF DESCRIPTION OF THE DRAWINGS

Other objects, features and advantages of the present invention will appear from the following detailed description of preferred embodiments thereof, given solely as non-limiting examples, with reference to the accompanying drawings, wherein.

DETAILED DESCRIPTION OF THE INVENTION

Figure 1:
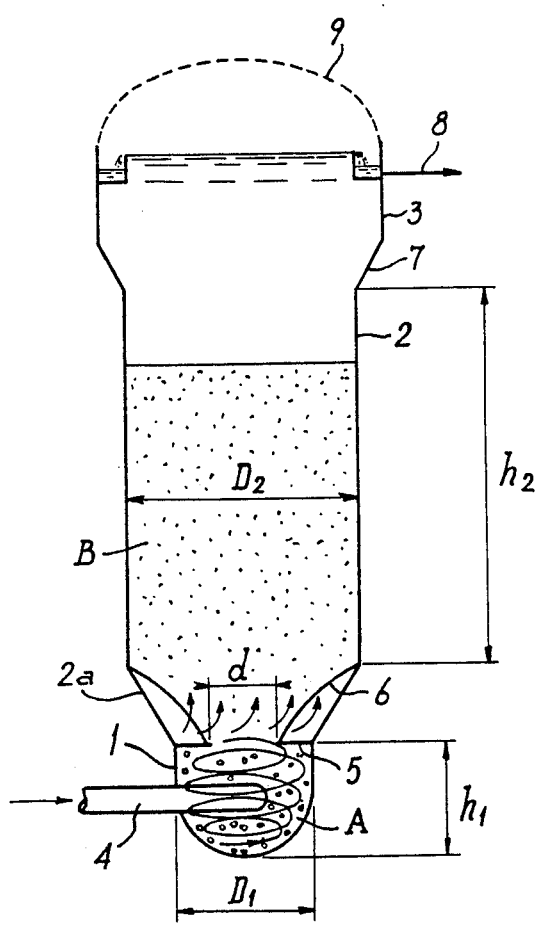
FIG. 1 is a schematic sectional view of one embodiment of a reactor according to the present invention.

In FIG. 1 there is shown a fluidized bed reactor for the biological treatment of water. The reactor includes a single housing formed of a lower enclosure 1 having superposed thereabove an upper enclosure 2. Lower enclosure 1 has a height $h_1$ and a diameter $D_1$. Upper enclosure 2 has a diameter $D_2$ and a height $h_2$. Upper and lower enclosures 2, 1 are connected by a truncated conical member 2a.

Enclosure 1 is filled with a granular transfer material A, and enclosure 2 is filled with a granular treating material B which is to form the fluidized bed. Water to be treated is introduced tangentially into enclosure 1 through a single pipe 4 at a speed to ensure fluidization of material B. This speed normally is at a nominal output of 1.5 to 3.5 m/s and ensures rapid start-up of movement of material A sufficient to prevent bacterial growth on the granules of material A. Thus, the tangential introduction through a single pipe 4 of the water to be treated causes a swirling movement of the water and the material A within enclosure 1. This results in a uniform distribution of the water and an upward diffusion in a uniform manner of the water from the material A into the granular treating material B in enclosure 2, thereby resulting in fluidization of material B. Thus, the arrangement of the present invention ensures a homogeneous distribution of the water into the bottom of material B.

An annular deflector 5 is positioned at the top of lower enclosure 1 and has an orifice communicating enclosures 1 and 2. As shown in FIG. 1, the interiors of enclosures 1 and 2 are in open and free two-way communication with each other through the orifice in deflector 5. Deflector 5 may be provided with guide blades 6 and operates to prevent rotation of the lower layers of fluidized material B and to ensure a general adjustment upwardly and a uniform distribution of the stream of water.

The diameters and heights of enclosures 1 and 2 are selected such that:

$$2 < \frac{D_2}{D_1} < 5 \quad 1 \leq \frac{h_1}{D_1} < 1.8 \quad \frac{h_2}{D_2} \geq 1$$

Also, the diameter d of the orifice through deflector 5 is such that:

$$1.2 < \frac{D_1}{d} < 1.5$$

Due to the above arrangements according to the present invention, the speed of the water in the fluidized bed of material B is distributed uniformly across the entire cross sectional surface of the reactor and is sufficient to cause expansion of material B by 20% to 60%, without causing either entrainment of material from outside the reactor or causing stripping of the biological film developed on the granules of material B.

As shown in FIG. 1, upper enclosure 2 is extended by a third enclosure 3 connected to enclosure 2 by a diverging truncated conical member 7. If the fermentation occurring in the reactor is required to proceed in the absence of air, and/or under atmospheric control, and/or under pressure, the top of the reactor is closed by an upper cover plate 9 which may be equipped with devices serving for the collection and evacuation of gas produced by the reaction, or residual of the reaction. Inside enclosure 3 is the necessary structure for clarification and collection of the treated water which is evacuated at 8.

Figure 2:
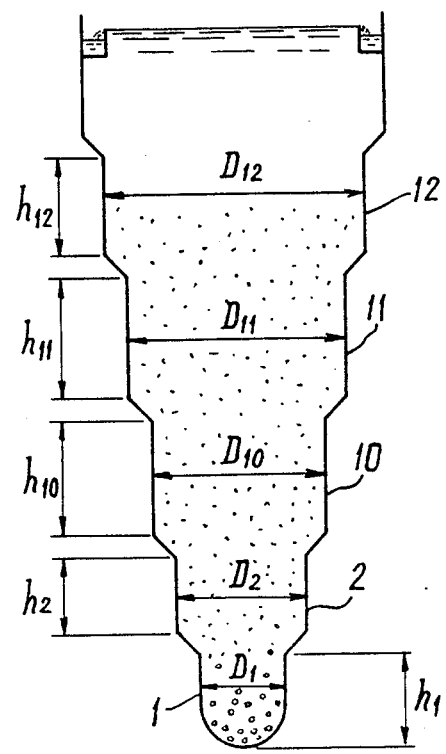
FIG. 2 is a view similar to FIG. 1 of a second embodiment.

The embodiment of FIGS. 2 differs from the embodiment of FIG. 1 by the provision of a plurality of superposed upper cylindrical enclosures 2, 10, 11, 12 interconnected by truncated conical members and all containing the granular treating material B to be fluidized. Regardless of the number of superimposed enclosures containing the granular treating material B, the heights and diameters of such enclosures are determined in accordance with the invention to satisfy the following relationships:

$$2 < \frac{D_2}{D_1} < 5 \quad 1 \leq \frac{h_1}{D_1} < 1.8$$

Furthermore, each additional upper enclosure n above the enclosure 2 has a diameter $D_n$ and a height $h_n$ such that:

$$\frac{h_n}{D_n} > 1.2$$

Furthermore, the ratio between the diameter $D_n$ of such enclosure n and the diameter $D_{n-1}$ of the next lower enclosure is:

$$1.2 < \frac{D_n}{D_{n-1}} < 2$$

When the reactor is started up, a granulometric grading takes place. Thus, the finest granules of material are fluidized in the upper part of the bed of the reactor and more coarse granules are fluidized at lower portions thereof. As a result, an increase in the number of enclosures will render the expansion rate of the fluidized granular material bed more uniform.

When colonization of the material occurs, i.e. when bacterial growth proceeds, a grading due to the resultant change of density of the granular material is added to the above discussed simple granulometric grading. Thus, when the granular material is covered with a biological film its apparent density decreases, and when the granular material is cleaned and regenerated, and therefore freed from the biological film, its density increases. It will be apparent from the above that the smaller diameter enclosures of the reactor will contain the coarser granules and also the granules of smaller diameter but having thereon colonized bacterial film. This will be the zone or area of the bed where the substrate concentration is the greatest, thus leading to a self-regulated system.

It is believed that one of ordinary skill in the art will understand what various types of material may be employed for the granular transfer material A and for the granular treating material B. Such materials advantageously are associated different types of pairs of materials having characteristics selected depending upon the particular functions each material is to provide in the operation of the reactor.

Examples of pairs of materials A and B which may be utilized are as follows:

| Nature | 1st combination | | 2nd combination | | 3rd combination | |
|---|---|---|---|---|---|---|
| | A sand | B pumice | A sand | B sand | A sand | B silico-aluminate (Biolite) |
| Mean diameter(mm) | 0.9 | 0.25 | 1.8 | 0.25 | 0.7 | 0.3 |

These specific pairs of materials however are intended to be exemplary only, since those skilled in the art will understand that various additional materials and pairs of materials may be employed while achieving the above discussed functions and manner of operation of the present invention.

The features of the present invention make it possible to construct a fluidized bed reactor of a diameter of up to 10 m, using a single input pipe for the water to be treated.

In the above discussion, the enclosures have been defined as being cylindrical. However, in accordance with the present invention the configurations of the enclosures may be other than cylindrical, i.e. they may have non-circular cross sections. In such arrangements, the adjacent superposed enclosures would be connected by members having various truncated shapes, for example truncated pyramids. The above dimensions, for example diameters $D_1$ and $D_2$, shown in FIG. 1 then would be of the circles inscribed in the particular cross sectional shapes of the respective enclosures.

Figure 3:
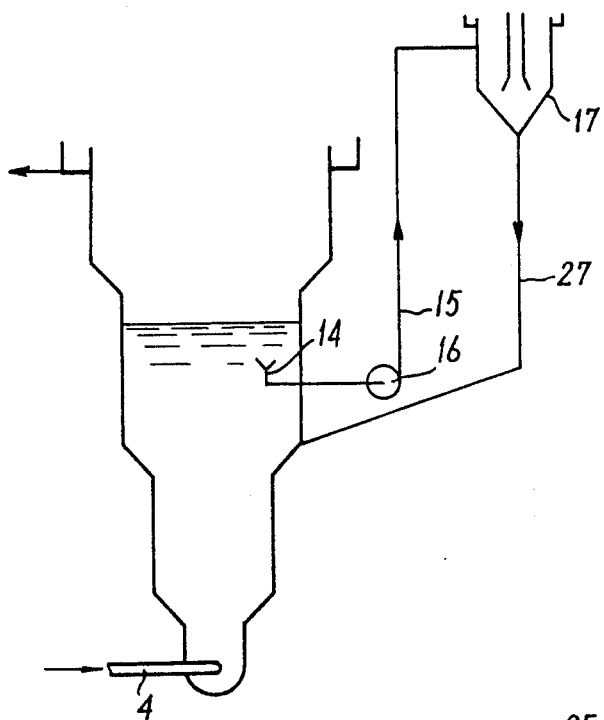
FIG. 3 is a similar schematic view, but illustrating a reactor according to the present invention equipped with an arrangement for regenerating the granular treating material.
Figure 4:
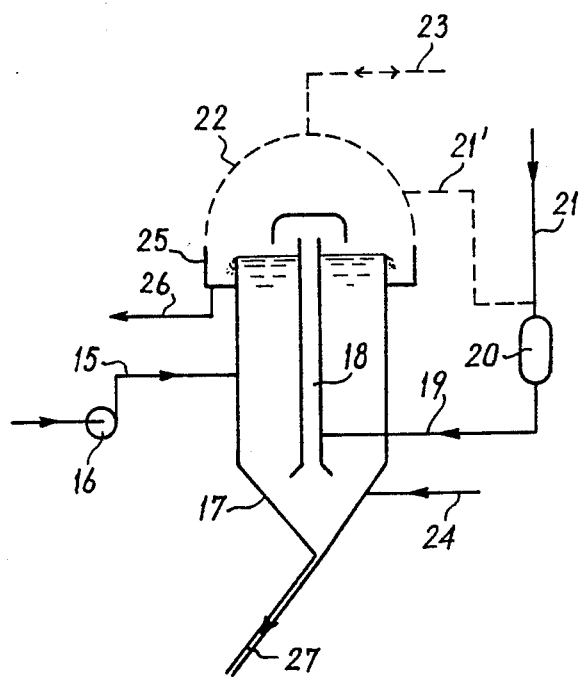
FIG. 4 is a schematic sectional view of the regenerating system.

During operation of the reactor, the granular treating material B progressively is covered by a bacterial film of ever increasing thickness. Thus, the material B has a tendency of becoming increasingly lighter with respect to the water and therefore must be regularly freed from the excess bacterial mass. One possible way for achieving this function, i.e. regeneration of the material B, is to cause the material to pass through a washer inside which internal circulation is achieved by means, for example, of a gas emulsifier, the gas being air or an oxygen-enriched gas in the case of an aerobic process, or it may be by the gas produced by fermentation within the reactor in the case of anaerobic or anoxic processes. FIGS. 3 and 4 show an example of this type of regeneration structure. Thus, one or a plurality of recovery devices 14 are disposed inside the reactor in the upper part of the fluidized bed. A pump 16 withdraws the material through recovery devices 14 and passes it through a pipe 15 to a washer in the form of an enclosure 17 having therein an emulsifier 18 which makes it possible to ensure internal recirculation by means of a gas feed 19 which causes considerable agitation of the material. The material thus is freed from its coat of excess organic material. A compressor 20 with a suction pipe 21 supplies the gas to the emulsifier at the required pressure. In the case of anaerobic processes, the suction pipe 21' is in communication with an upper chamber of the gas-filled washer which then is closed by a cover 22 and connected by a pipe 23 to a variable volume gas storage chamber (not shown).

The regeneration of the material B is achieved as follows. Thus, material B requiring regeneration and water are transferred to washer 17. The resultant suspension is recirculated through 18 by the supply of compressed gas at 19. Stoppage of such recirculation and dispatch of a quantity of rinsing liquid from a pipe 24 causes movement of the separated film particles upwardly and evacuation thereof through a recovery device 25 and pipe 26. The thereby regenerated material B is conveyed back to the reactor through a pipe 27, with the help of rinsing liquid supplied through pipe 24. These operations may be carried out continuously or discontinuously and are suited for automation.

Although the present invention has been described and illustrated with respect to preferred features thereof, it is to be understood that various modifications and changes may be made to the specifically described and illustrated arrangements without departing from the scope of the present invention.

We claim:

1. In a fluidized bed reactor for the biological treatment of fluids, particularly liquids, and more particularly water, said reactor being of the type containing granular treating material through which the fluid to be treated passes upwardly, thereby fluidizing said treating material, and during which biological treatment is achieved, the improvement of means for ensuring a homogeneous distribution of the fluid into the bottom of said granular treating material, said means comprising:

granular transfer material positioned beneath said granular treating material;

a single housing defined by plural superposed enclosures including a lower enclosure containing said granular transfer material and at least one upper enclosure containing said granular treating material;

means for introducing the fluid to be treated into said granular transfer material at a speed and under conditions sufficient to impart movement thereto causing uniform distribution of the fluid and uniform diffusion thereof upwardly into said granular treating material at a speed sufficient to achieve fluidization thereof; and said lower and upper enclosures being dimensioned such that said granular transfer material is prevented from being fluidized upwardly and is not involved in the biological treatment of the fluid.

2. The improvement claimed in claim 1, wherein said introducing means comprises a single pipe extending tangentially into said lower enclosure for introducing all of the fluid into said granular transfer material.

3. The improvement claimed in claim 1, wherein said enclosures are cylindrical and are connected by truncated members.

4. The improvement claimed in claim 3, wherein said lower enclosure has a diameter ($D_1$) and a height ($h_1$) and said upper enclosure directly above said lower enclosure has a diameter ($D_2$) and a height ($h_2$) according to the following relationships:

$$2 < \frac{D_2}{D_1} < 5 \quad 1 \leq \frac{h_1}{D_1} < 1.8 \quad \frac{h_2}{D_2} \cong 1$$

5. The improvement claimed in claim 4, comprising a plurality of additional upper enclosures superposed sequentially above said upper enclosure directly above said lower enclosure, said additional upper enclosures containing said granular treating material.

6. The improvement claimed in claim 5, wherein each said additional upper enclosure n has a diameter ($D_n$) and a height ($h_n$) such that:

$$\frac{h_n}{D_n} > 1.2,$$

and the ratio between diameter ($D_n$) and the diameter ($D_{n-1}$) of the next lower said enclosure is:

$$1.2 < \frac{D_n}{D_{n-1}}$$

7. The improvement claimed in claim 1, further comprising an annular deflector positioned at the top of said lower enclosure and having an orifice communicating said lower and upper enclosures.

8. The improvement claimed in claim 7, wherein the ratio of the diameter ($D_1$) of said lower enclosure to the diameter (d) of said orifice of said annular deflector is:

$$1.2 < \frac{D_1}{d} < 1.5$$

9. The improvement claimed in claim 7, further comprising guide blades extending from said annular deflector.

10. The improvement claimed in claim 1, wherein said granular treating and transfer materials have different characteristics.

11. The improvement claimed in claim 1, wherein said introducing means supplies the fluid into the reactor at a speed of from 1.5 to 3.5 m/s.

12. The improvement claimed in claim 1, further comprising means for removing said granular treating material from said single enclosure, regenerating the thus removed granular treating material in a washer exterior of said single enclosure and including means for intensively recirculating said removed granular treating material within said washer, and returning the thus regenerated granular treating material to said single enclosure.

13. The improvement claimed in claim 1, wherein the interiors of said lower and upper enclosures are in open and free two-way communication.

* * * * *